United States Patent
Wang et al.

(10) Patent No.: US 10,715,349 B2
(45) Date of Patent: Jul. 14, 2020

(54) PPPOE EXTENSION OVER LAYER 2 SWITCH EMBEDDING PPPOE AGENT

(71) Applicant: Raytheon Company, Waltham, MA (US)

(72) Inventors: Mu-Cheng Wang, Acton, MA (US); Mario D'Amico, Watertown, MA (US)

(73) Assignee: Raytheon Company, Waltham, MA (US)

( * ) Notice: Subject to any disclaimer, the term of this patent is extended or adjusted under 35 U.S.C. 154(b) by 67 days.

(21) Appl. No.: 16/033,631

(22) Filed: Jul. 12, 2018

(65) Prior Publication Data
US 2020/0021458 A1    Jan. 16, 2020

(51) Int. Cl.
| | |
|---|---|
| H04L 12/26 | (2006.01) |
| H04L 12/28 | (2006.01) |
| H04L 12/54 | (2013.01) |
| H04L 29/08 | (2006.01) |
| H04L 12/70 | (2013.01) |

(52) U.S. Cl.
CPC .......... *H04L 12/2859* (2013.01); *H04L 12/54* (2013.01); *H04L 69/324* (2013.01); *H04L 69/325* (2013.01); *H04L 2012/5618* (2013.01)

(58) Field of Classification Search
CPC ... H04L 12/2859; H04L 12/54; H04L 69/324; H04L 69/325; H04L 2012/5618
See application file for complete search history.

(56) References Cited

U.S. PATENT DOCUMENTS

| | | | | |
|---|---|---|---|---|
| 2004/0062254 | A1* | 4/2004 | Kuzhiyil | H04L 69/168 370/401 |
| 2004/0132473 | A1* | 7/2004 | Mir | H04L 29/12216 455/517 |
| 2007/0248085 | A1 | 10/2007 | Volpano | |

(Continued)

FOREIGN PATENT DOCUMENTS

| | | |
|---|---|---|
| EP | 1 871 052 A1 | 12/2007 |
| WO | WO 2008/074369 A1 | 6/2008 |

OTHER PUBLICATIONS

Berry et al., "PPP Over Ethernet (PPPoE) Extensions for Credit Flow and Link Metrics;" Retrieved from: https://tools.ietf.org/html/rfc5578; RFC5578. TXT, Internet Engineering Task Force, IETF; Feb. 2, 2010; 24 Pages.

(Continued)

*Primary Examiner* — Minh Trang T Nguyen
(74) *Attorney, Agent, or Firm* — Daly, Crowley, Mofford & Durkee, LLP

(57) ABSTRACT

A network system is provided. The network system includes a first network device and a second network device running in data link layer (L2). The first network device includes a first switch and a first PPPoE (Point-to-Point over Ethernet) agent integrally coupled to the first switch. The second network device also includes a second switch and a second PPPoE agent integrally coupled to the second switch. The network system further includes a PPPoE client running in network layer (L3) that communicates to the first PPPoE agent and a PPPoE server in L3 that communicates to the second PPPoE agent. The PPPoE client uses a broadcast (Bcast) MAC address in an initial IPCP (Internet Protocol Control Protocol) negotiation message between the PPPoE client and the PPPoE server.

21 Claims, 5 Drawing Sheets

(56) References Cited

U.S. PATENT DOCUMENTS

2008/0086549 A1* 4/2008 Wei ................... H04L 12/2859
709/222
2010/0287287 A1* 11/2010 Trentini ............. H04L 12/2856
709/228

OTHER PUBLICATIONS

Cheng et al., "Utilizing the Broadcast Medium while Maintaining Per-Link Information: A Practical Approach;" 2011 Military Communications Conference (MILCOM)—Track 2—Network Protocols and Performance; Nov. 7, 2011; 5 Pages.

Mamakos et al., "A Method for Transmitting PPP Over Ethernet (PPPoE);" Retrieved from https://tools.ietf.org/html/rfc2516; RFC2516; XP-002198847; Feb. 1, 1999; 17 Pages.

Veytser et al., "An Implementation of a Common Virtual Multipoint Interface in Linux;" 2011 Military Communications Conference (MILCOM)—Track 2—Network Protocols and Performance; Nov. 7, 2011; 6 Pages.

PCT International Search Report and Written Opinion dated Sep. 2, 2019 for International Application No. PCT/US2019/024730; 16 Pages.

\* cited by examiner

PPPOE EXTENSION OVER LAYER 2 SWITCH EMBEDDING PPPOE AGENT

TECHNICAL FIELD

This disclosure generally relates to a transportation network and more particularly to a transportation network with Point-to-Point Protocol over Ethernet (PPPoE) agent incorporated into a layer 2 switch.

BACKGROUND

Request for Comments (RFC) 5578, an Internet Engineering Task Force (IETF) standard, defines the Point-to-Point Protocol over Ethernet (PPPoE) with Credit-Based Extensions for Ethernet-based communications between a router and a modem that operates in a variable bandwidth environment and has limited buffering capabilities. To support the credit-based flow control extensions, PPPoE peers can grant each other forwarding credits. The grantee is allowed to forward traffic to the peer only when it has a sufficient number of credits. When credit-based forwarding is used on both sides of the session, the radio client can throttle traffic by limiting the number of credits it grants to the router. RFC 5578 is a promising technology which can serve as a bridge to merge two very different worlds, IP routing and mobile radio, while taking advantage of the strengths of each.

Attempts on using the RFC 5578 with a PPPoE agent embedded into a Layer 2 switch have not been successful. To address this compatibility issue, modifications to the RFC 5578 implementation have been proposed such that the destination MAC (Media Access Control) address of the protocol negotiation message is replaced by the pre-defined MAC address once it is received by the Layer 2 switch. However, this will cause incompatibilities with other RFC 5578 compliant COTS devices. In addition, users may not be able to remotely access the switch because the access requests will be forwarded to the device with the pre-defined MAC address. Furthermore, when the network condition changes, e.g., the destined device is replaced, it requires the system administrators to manually reconfigure the switch at runtime. The reconfiguration process is time-consuming and error-prone which is undesirable.

SUMMARY

The concepts, systems, and techniques disclosed herein are directed toward a network system to form a PPPoE (Point-to-Point over Ethernet) connection between routers. According to one illustrative embodiment of the present invention, the network system may include a first network device and a second network device running in data link layer (L2). The first network device may include a first switch and a first PPPoE (Point-to-Point over Ethernet) agent integrally coupled to the first switch. The second network device also may include a second switch and a second PPPoE agent integrally coupled to the second switch. The network system further includes a PPPoE client running in network layer (L3) that communicates to the first PPPoE agent and a PPPoE server in L3 that communicates to the second PPPoE agent. The PPPoE client may use a broadcast (Bcast) MAC address in an initial IPCP (Internet Protocol Control Protocol) negotiation message between the PPPoE client and the PPPoE server.

In one variation of the illustrative embodiment, IPCP negotiation may comprise LCP (Link Control Protocol) and NCP (Network Control Protocol) negotiation.

In one variation of the illustrative embodiment, the PPPoE client may replace MAC address of the PPPoE server with the Bcast MAC address in the initial IPCP negotiation message.

In one variation of the illustrative embodiment, the PPPoE client may get a destination MAC address of the PPPoE server in the IPCP negotiation.

In one variation of the illustrative embodiment, the PPPoE client may use the destination MAC address of the PPPoE server when transmitting a PPP (Point-to-Point Protocol) frame.

In one variation of the illustrative embodiment, a PPP connection between the PPPoE client and the PPPoE server may provide a transport service between the PPPoE client and the PPPoE server.

In one variation of the illustrative embodiment, a PPP (point-to-point protocol) frame may be handled in a same manner as a regular data link layer frame over the connection between the PPPoE client and the PPPoE server.

According to another illustrative implementation of the present invention, a network device may include a switch running in data link layer (L2) and a PPPoE (Point-to-Point over Ethernet) agent integrally coupled to the switch. The PPPoE agent may communicates to a PPPoE client running in network layer (L3). Here, the PPPeE client communicates to a PPPoE server that is running in network layer (L3) and is communicating to a second PPPoE agent of a second network device. The PPPeE client may use a broadcast (Bcast) Media Access Control (MAC) address in an initial IPCP (Internet Protocol Control Protocol) negotiation message.

In one variation of the illustrative embodiment, IPCP negotiation may comprise LCP (Link Control Protocol) and NCP (Network Control Protocol) negotiation.

In one variation of the illustrative embodiment, the PPPoE client may replace the MAC address of the PPPoE server with the Bcast MAC address in the initial IPCP negotiation message.

In one variation of the illustrative embodiment, the PPPoE client may get a destination MAC address of the PPPoE server in the IPCP negotiation.

In one variation of the illustrative embodiment, the PPPoE client may use the destination MAC address of the PPPoE server when transmitting a PPP (Point-to-Point Protocol) frame.

In one variation of the illustrative embodiment, a connection between the PPPoE client and the PPPoE server may provide a transport service between the PPPoE client and the PPPoE server.

In one variation of the illustrative embodiment, a PPP (point-to-point protocol) frame may be handled in a same manner as a regular data link layer frame over the connection between the PPPoE client and the PPPoE server.

According to an illustrative method of the present invention, a method for forming a PPP (Point-to-Point) connection between a PPPoE (Point-to-Point over Ethernet) client and a PPPoE server running in network layer (L3) may include discovering a first network device and a second network device running in data link layer (L2). The first network device communicates with the PPPoE client and the second network device communicates with the PPPoE server. The method further includes negotiating configuration between the PPPoE client and the PPPoE server using broadcast MAC address, getting a destination Media Access Control (MAC) address of the PPPoE server, and establishing the PPP connection between the PPPoE client and the PPPoE server.

In one variation of the illustrative method, each of the first network device and the second network device may comprise a switch running in data link layer and a PPPoE agent integrally coupled to the switch.

In one variation of the illustrative method, the negotiating configuration between the PPPoE client and the PPPoE server may further comprise replacing a MAC address of the PPPoE server with the broadcast MAC address in an initial IPCP negotiation message so that the PPPoE server may respond with its MAC address to the IPCP negotiation message.

In one variation of the illustrative method, the discovering a first network device and a second network device may comprise discovering the PPPoE server and the PPPoE client, and establishing connections between the first network device and the PPPoE client and the second network device and the PPPoE server respectively.

In one variation of the illustrative method, the PPPoE client may use the destination MAC address of the PPPoE server when transmitting a PPP (Point-to-Point Protocol) frame.

In one variation of the illustrative method, PPP connection between the PPPoE client and the PPPoE server may provide a transport service between the PPPoE client and the PPPoE server.

In one variation of the illustrative method, a PPP frame may be handled in a same manner as a regular data link layer frame over the connection between the PPPoE client and the PPPoE server.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

The advantages of the concepts described above, together with further advantages, may be better understood by referring to the following description in conjunction with the accompanying drawings. The drawings are not necessarily to scale, and emphasis is instead being placed upon illustrating the principles of the claimed concepts.

Like reference symbols in the various drawings indicate like elements.

DETAILED DESCRIPTION

All relative descriptions herein, such as left, right, up, and down, are with reference to the Figures, and are not meant in a limiting sense. Additionally, for clarity, common items and circuitry, such as network control integrated circuits, System on Chip (SoC), and the like, have not been included in the Figures, as can be appreciated by those of ordinary skill in the pertinent art. Unless otherwise specified, the illustrated embodiments may be understood as providing example features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed concepts, systems, or methods. Additionally, the shapes and sizes of components intended to be only illustrative and unless otherwise specified can be altered without materially affecting or limiting the scope of the concepts sought to be protected herein.

Figure 1:
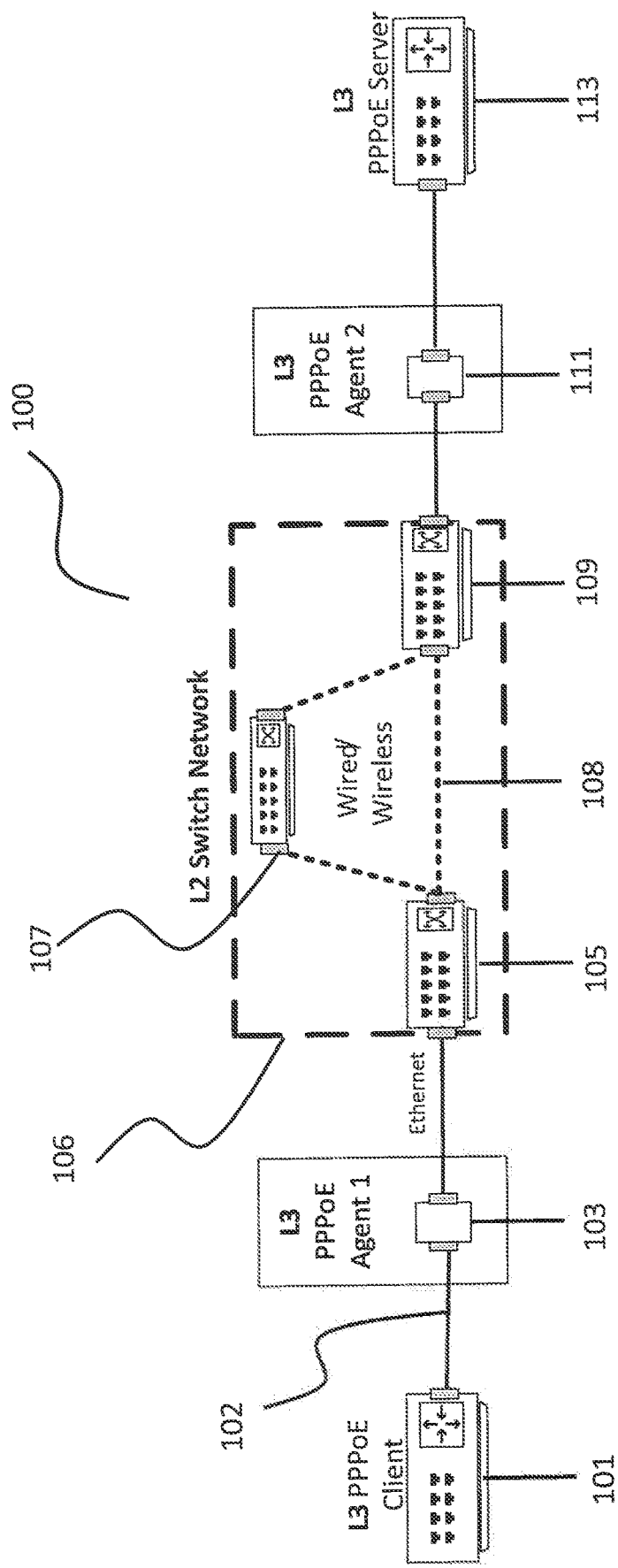
FIG. 1 is a block diagram of an exemplary implementation of PPPoE network implementation in accordance with prior embodiments.

Before describing example embodiments of the invention some information is provided. Referring now to FIG. 1, an illustrative embodiment of a conventional PPPoE implementation over data link layer (L2) and network layer (L3) is provided. The network system 100 shown in FIG. 1 implements a PPPoE extension for credit flow and link metrics that is described in RFC 5578. An L3 PPPoE client 101 may communicate to an L3 PPPoE server 113 through a PPP (Point-to-Point Protocol) session established over a PPPoE connection between the L3 PPPoE client 101 and the L3 PPPoE server 103.

As defined in the OSI 7 Layer Model, the PPPoE client 101 and the PPPoE server 113 running in L3 transmits a data packet through a layer N−1, that is Layer 2 in this model. The data packet to be transmitted is composed at L3 by the PPPoE client. The data packet is passed to L2. At L2, the data packet will be concatenated with a frame header and a frame sequence at the end. The L2 data packet may be transferred over the L2 switch network 106. The L2 switch network may have a plurality of L2 switches 105, 107, 109, where the switches are connected wired or wireless 108. The L2 data packet arrives at the L3 device, for example, the PPPoE server 103, the frame header and the frame sequence at the end may be removed.

To implement a PPP connection between the client and the server, a first L3 PPPoE agent 103 and a second PPPoE agent 111 may exist between the PPPoE client 101 and the L2 switch network 106, and the L2 switch network 106 and the PPPoE server 113 respectively. In this illustrative embodiment, the PPPoE agents may be a stand-alone L3 device. Herein, during a discovery phase, when the PPPoE client/server detects the presence of a neighboring PPPoE agent, i.e., the PPPoE agent 103, 111; the PPPoE client/server initiates a PPPoE connection with the PPPoE agent 103, 111. The PPPoE client/server may discover the PPPoE agents using the broadcast MAC addresses. In some embodiments, this discovery may not be needed because there is only one PPPoE agent per the PPPoE client/server respectively.

To establish a PPP connection, after the discovery phase, the PPPoE client 101 and the PPPoE server 113 may perform an IPCP (Internet Protocol Control Protocol) negotiation phase, which performs LCP (Link Control Protocol) and NCP (Network Control Protocol) negotiation. The LCP is used to establish, configure, and test a link as well as negotiate settings, options and the use of features of the PPP connection. In addition, one or more NCP may be used to negotiate optional configuration parameters and facilities for network layer. During this IPCP negotiation phase, the PPPoE client/server 101, 113 may use a destination of the MAC address of the PPPoE agent 103, 111. The MAC address of the PPPoE agent may be learned during the discovery phase. Herein, the PPPoE agents may serve as a proxy on behalf of the PPPoE client/server. Furthermore, the L2 switch network may provide transparent network service and may be totally transparent to PPP frames. Once a PPP connection is established in the IPCP phase, the PPPoE client/server 101, 113 transmit data packets using the MAC addresses of the PPPoE agents 103, 111.

Figure 2:
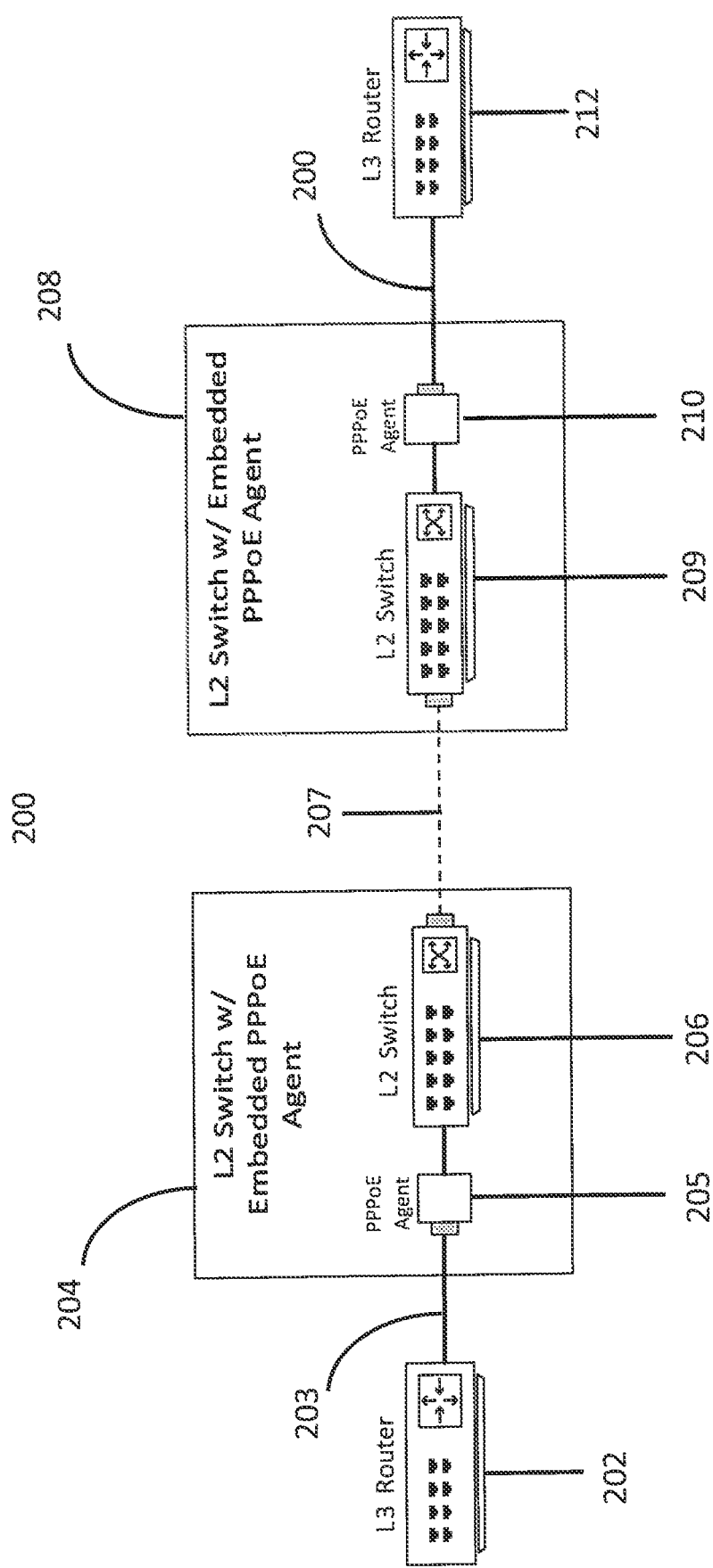
FIG. 2 is a block diagram of an exemplary implementation of PPPoE network in accordance with embodiments disclosed herein.

Referring now to FIG. 2, an illustrative PPPoE with credit-based extensions for Ethernet-based communications implementation over the enhanced L2 network in accordance with example embodiments of the invention is provided.

This protocol, RFC 5578 which is an IETF standard, has been adopted in some communication systems with an embedded Layer 2 switch as an effort to implement RFC 5578 using L2 devices without separate standalone L3 PPPoE agents.

However, implementing RFC 5578 using L2 devices without separate standalone L3 PPPoE agents has a compatibility issue as described below. When a PPPoE agent designed as an L3 entity is embedded in an L2 switch, the RFC 5578 protocol may not function as intended due to compatibility issues between the L2 switch and the L3 PPPoE agent. As described above with regard to FIG. 1, a MAC address of a PPPoE agent is learned during a discovery phase. However, when the PPPoE agent 205 is embedded in an L2 switch 204 as shown in FIG. 2, the L2 switch and the L3 PPPoE agent share the same MAC address. When an L3 PPPoE client 202 transmits an IPCP frame to the PPPoE agent 205 using the MAC address learned during the previous stage, the L2 switch 206 becomes the recipient of the IPCP frame. However, the switch 206 does not know how to handle the received LCP & NCP negotiation message, when the L2 switch 206 attempts to process the message, the switch 206 discards the negotiation request instead of forwarding the message to the final destination, which is an L3 PPPoE server 212. Thus, the LCP & NCP negotiations process cannot succeed, and a PPP connection cannot be established between the two end-points (i.e., routers).

One previous attempt to address this limitation of RFC 5578 is replacing the destination MAC address of the IPCP negotiation message with a pre-defined MAC address (i.e., the other end router's MAC address). In this way, an L2 switch discarding the PPP frame may be avoided. However, this implementation is not compatible with other RFC 5578 compliant COTS devices. This implementation may also cause unexpected side-effects—for example; users cannot remotely access the switch. That is because instead of processing the access request locally, the switch will automatically replace the received frame's destination MAC address by the pre-defined MAC address and then forward the revised access request to the other router. Furthermore, when the network condition changes, e.g., change the destined device or port, it requires network administrators to manually modify the pre-defined MAC address in the switch at the runtime. This reconfiguration process may interrupt the service and is time-consuming and error-prone which is undesirable.

To address the above, referring again to FIG. 2, an L3 PPPoE client 202 and an L3 PPPoE server 212 may transport PPP frames through L2 Switch having an embedded PPPoE agent. As shown in FIG. 2, the PPPoE client 202 may use a B cast (broadcast) MAC address when the PPPoE client 202 transmits an IPCP negotiation frame over the L2 network. Herein, the L2 switch 206 having the PPPoE agent 205 forwards the IPCP frame instead of processing the IPCP frame by itself. An example method for establishing this RFC 5578 connection over the enhanced L2 network is described in detail with FIG. 3.

Figure 3:
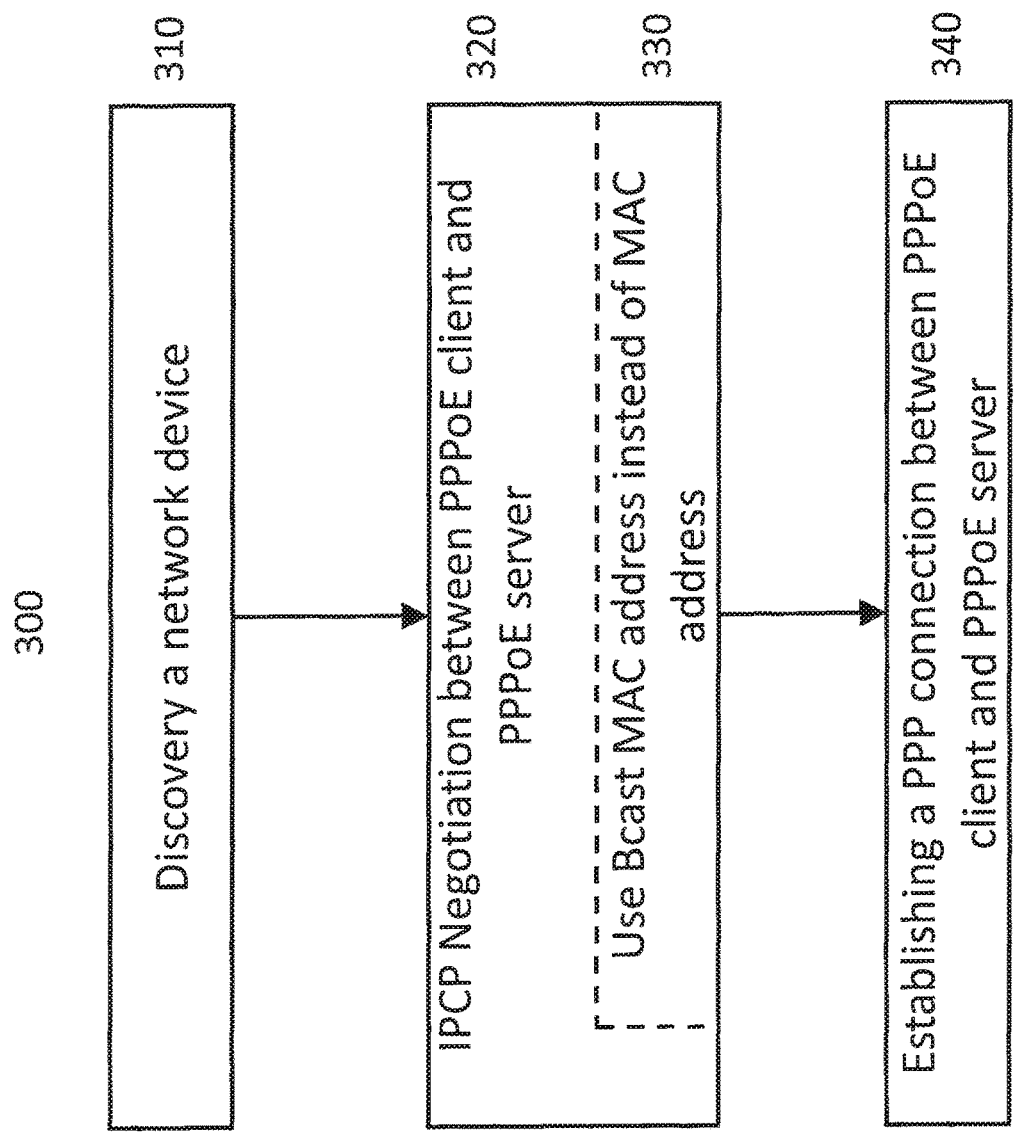
FIG. 3 is a flowchart of an exemplary implementation of PPPoE network in accordance with embodiments disclosed herein.

Referring now to FIG. 3, a flowchart 300 of an example of establishing a PPPoE connection over the enhanced L2 network is described. In step 310, during a discovery phase, when an L3 PPPoE client/server 202, 212 detects the presence of an L3 PPPoE agents 205, 210. The PPPoE client/server may discover the PPPoE agents 205, 210 using the broadcast MAC addresses. In some embodiments, this discovery may not be needed because there is only one PPPoE agent per the PPPoE client/server respectively. The PPPoE client/server 202, 212 can detect MAC addresses of their agents when the physical layer is up.

Due to the conflict between an L2 switch and a L3 PPPoE agent described above, in step 320, during IPCP negotiation, the PPPoE client 202 needs to "relearn" the destination MAC address of PPPoE server 212. In order to relearn the destination MAC address, a broadcast MAC address, i.e., FFFF.FFFF.FFFF, may be used initially in an IPCP negotiating message (Step 330). The step 330 is a sub step of the step 320. Here, because the L2 switch 206 does not process the broadcast message locally, the L2 switch 206 simply distributes the IPCP negotiation message to all the connected devices. When the targeted device receives the negotiation message, the targeted device will respond to the IPCP negotiation request so that the LCP & NCP negotiation process may start between two end-points (Step 320).

In Step 340, the PPPoE client 202 and the PPPoE server 212 may establish a PPP connection over the enhanced L2 switch network, where each of the L2 switches imbeds a PPPoE agent. By doing this, there is no need for a pre-defined MAC address. Furthermore, this solution may allow automatic reconfiguration of the network in case the network conditions change. That is, there is no need for manual reconfiguration of the destination MAC address.

Figure 4:
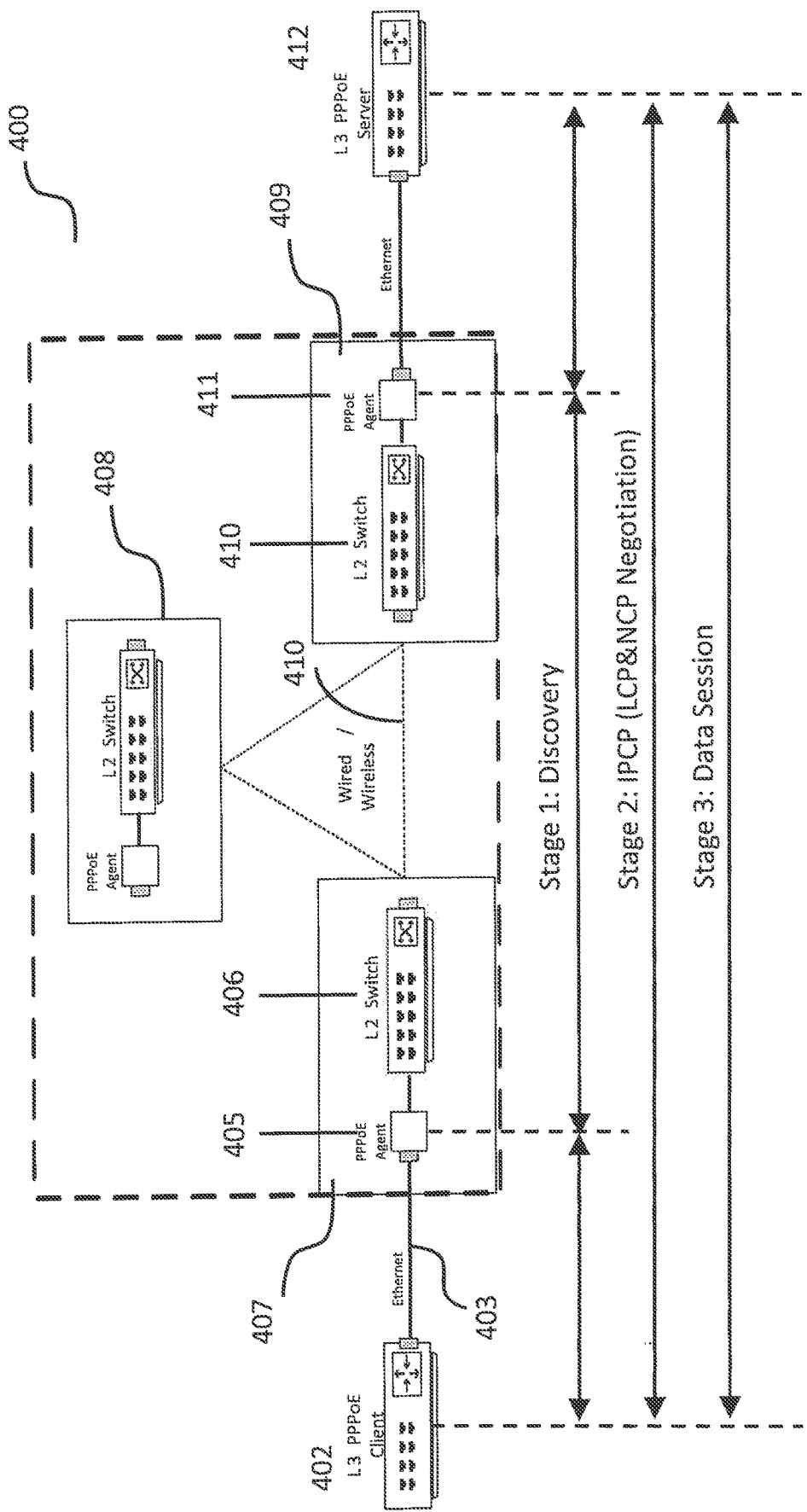
FIG. 4 is another block diagram of an exemplary implementation of PPPoE network in accordance with embodiments disclosed herein.

Referring now to FIG. 4, another block diagram of an exemplary implementation of PPPoE network is described. The network system 400 may comprise a PPPoE client 402, a PPPoE server 412, and an enhanced L2 switch network 401 having two or more enhanced L2 switches 407, 408, 409. Each of the enhanced L2 switches may include an L2 switch 406, 410 and embedded PPPoE agent 405, 411.

As described in a method of FIG. 3, the PPPoE client 402 and the PPPoE server 412 discovers other devices during a discovery phase. In an embodiment, the discovery of the PPPoE agent 405, 411 may not be needed because there is only one PPPoE agent per each of the PPPoE client and the PPPoE server respectively.

During IPCP phase, LCP & NCP negotiation is performed using a Bcast MAC address instead of the MAC address of the PPPoE agent learned during the discovery phase. Then the PPPoE agent 405 distributes LCP & NCP negotiation message over L2 network instead of discarding the message when the L2 switch 406 does not know how to handle the IPCP message. In this way, the PPPoE client 402 and the PPPoE server 412 may be able to establish a PPP session between the client and server.

Once the PPP session is established between the PPPoE client 402 and the PPPoE server 412, PPP frames may be transmitted between the client and server. The enhanced L2 switch network 401 may provide the transport services to the L3 routers. Here, the L2 network may treat PPP frames as regular L2 frames without requiring special handling. In some embodiments, the connection between the L2 switches with embedded PPPoE agent may be implemented as Provider Backbone Bridges (PBB, also known as Mac-in-Mac). PBB is a set of architecture and protocols for routing over a provider's network allowing interconnection of multiple Provider Bridge Networks without losing each customer's individually defined Virtual LANs (VLANs). In this way, this Mac-in-Mac may provide a single customer's VLANs across the Metropolitan Area Network (MAN) and/or Wide Area Network (WAN) which is transparent to the routers. Herein, the Mac-in-Mac connection may transport PPP frames as like other L2 frames.

As described above, the inventive concepts illustrated in this application may resolve compatibility issues between RFC 5578 and embedded PPPoE agent in L2 switch. Furthermore, the illustrative implementation may provide backward compatibility to other elements of RFC 5578.

Figure 5:
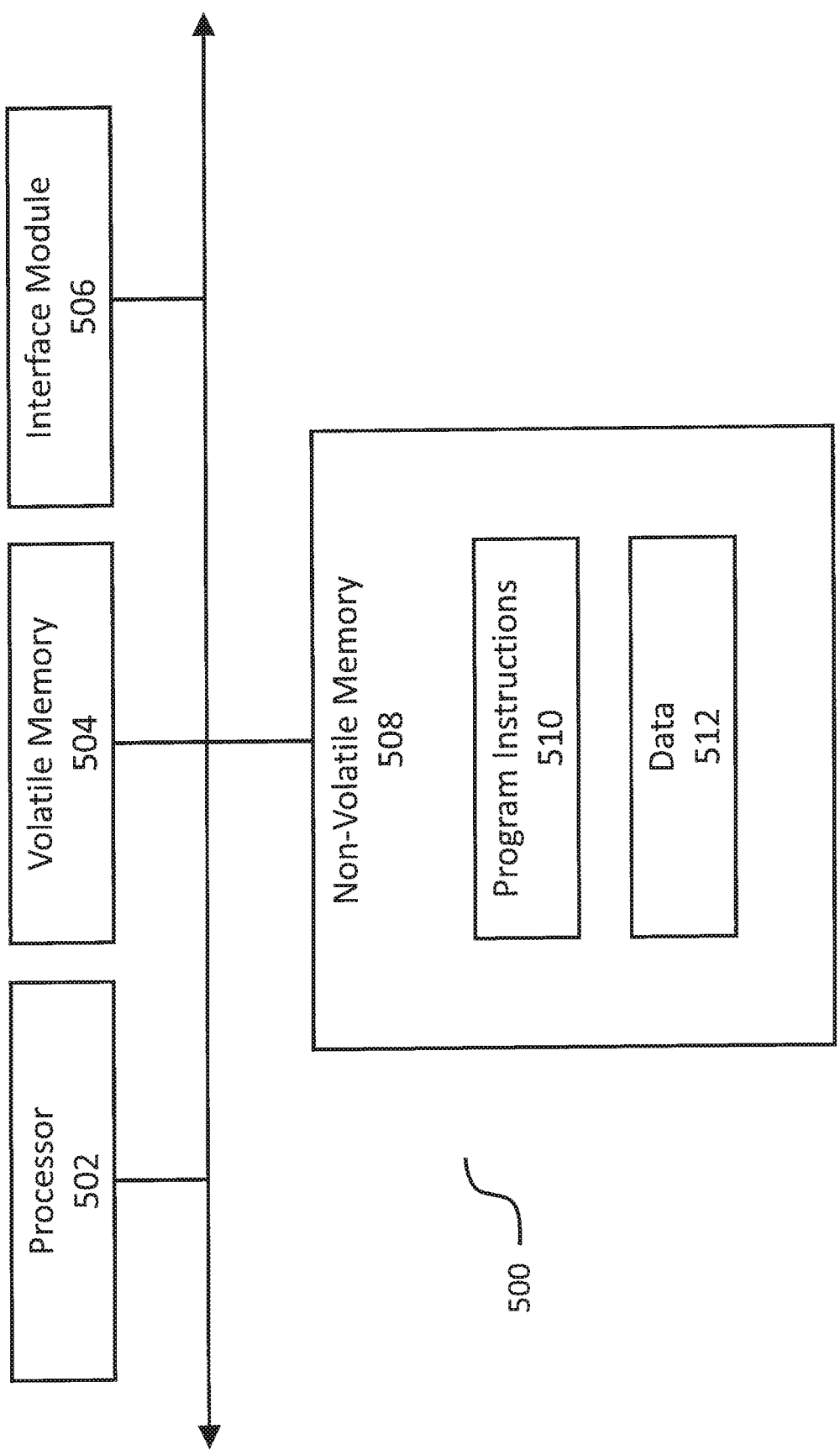
FIG. 5 is a block diagram of an exemplary implementation of a PPPoE agent in FIG. 2.

Referring now to FIG. 5, an example of the PPPoE agent 112 is the PPPoE agent 500. The PPPoE agent 500 includes a processor 502, a volatile memory 504, a non-volatile memory 506 (e.g., hard disk) and the interface module 508 (e.g., a user interface, USB interface and so forth). The non-volatile memory 506 stores computer instructions 512, an operating system 516 and data 518. In one example, the computer instructions 512 are executed by the processor 502 out of volatile memory 504 to perform all or part of the processes described herein (e.g., process 300).

The process described herein (e.g., process 300) is not limited to use with the hardware and software of FIG. 5; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or another article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to work with the rest of the computer-based system. However, the programs may be implemented in assembly, machine language, or Hardware Description Language. The language may be a compiled or an interpreted language and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

Accordingly, other embodiments are within the scope of the following claims.

What is claimed is:

1. A network system comprising:
a first network device running in data link layer (L2), comprising a first switch and a first PPPoE (Point-to-Point over Ethernet) agent integrally coupled to the first switch;
a second network device running in data link layer (L2), comprising a second switch and a second PPPoE agent integrally coupled to the second switch;
a PPPoE client, running in network layer (L3), communicating to the first PPPoE agent; and
a PPPoE server, running in network layer (L3), communicating to the second PPPoE agent,
wherein the PPPeE client is configured to establish a PPPoE connection with the PPPeE server by transmitting a broadcast (Bcast) Media Access Control (MAC) address in an initial IPCP (Internet Protocol Control Protocol) negotiation message.

2. The network system of claim 1, wherein IPCP negotiation comprises LCP (Link Control Protocol) and NCP (Network Control Protocol) negotiation.

3. The network system of claim 1, wherein the PPPoE client replaces MAC address of the PPPoE server with the Bcast MAC address in the initial IPCP negotiation message.

4. The network system of claim 1, wherein the PPPoE client gets a destination MAC address of the PPPoE server in the IPCP negotiation.

5. The network system of claim 1, wherein the PPPoE client uses the destination MAC address of the PPPoE server when transmitting a PPP (Point-to-Point Protocol) frame.

6. The network system of claim 1, wherein a PPP connection between the PPPoE client and the PPPoE server provides a transport service between the PPPoE client and the PPPoE server.

7. The network system of claim 6, wherein a PPP (point-to-point protocol) frame is handled in a same manner as a regular data link layer frame over the connection between the PPPoE client and the PPPoE server.

8. A network device comprising:
a switch running in data link layer (L2); and
a PPPoE (Point-to-Point over Ethernet) agent integrally coupled to the switch, wherein the PPPoE agent communicates to a PPPoE client running in network layer (L3),
wherein the PPPeE client communicates to a PPPoE server, running in network layer (L3), communicating to a second PPPoE agent of a second network device,
wherein the PPPeE client is configured to establish a PPPoE connection with the PPPeE server by transmitting a broadcast (Bcast) Media Access Control (MAC)

address in an initial IPCP (Internet Protocol Control Protocol) negotiation message.

9. The network device of claim 8, wherein IPCP negotiation comprises LCP (Link Control Protocol) and NCP (Network Control Protocol) negotiation.

10. The network device of claim 8, wherein the PPPoE client replaces MAC address of the second PPPoE agent with the Bcast MAC address in the initial IPCP negotiation message.

11. The network device of claim 8, wherein the PPPoE client gets a destination MAC address of the PPPoE server in the IPCP negotiation.

12. The network device of claim 8 wherein the PPPoE client uses the destination MAC address of the PPPoE server when transmitting a PPP (Point-to-Point Protocol) frame.

13. The network device of claim 8, wherein a connection between the PPPoE client and the PPPoE server provides a transport service between the PPPoE client and the PPPoE server.

14. The network device of claim 13, wherein a PPP (point-to-point protocol) frame is handled in a same manner as a regular data link layer frame over the connection between the PPPoE client and the PPPoE server.

15. A method for forming a PPP (Point-to-Point) connection between a PPPoE (Point-to-Point over Ethernet) client and a PPPoE server running in network layer (L3), the method comprising:
   discovering a first network device and a second network device running in data link layer (L2), wherein the first network device communicates with the PPPoE client and the second network device communicates with the PPPoE server;
   negotiating configuration between the PPPoE client and the PPPoE server using broadcast MAC address that is transmitted by the PPPoE client in an initial IPCP (Internet Protocol Control Protocol) negotiation message;
   getting a destination Media Access Control (MAC) address of the PPPoE server; and
   establishing the PPP connection between the PPPoE client and the PPPoE server.

16. The method of claim 15, wherein each of the first network device and the second network device comprises a switch running in data link layer and a PPPoE agent integrally coupled to the switch.

17. The method of claim 15, wherein the negotiating configuration between the PPPoE client and the PPPoE server further comprises replacing a MAC address the PPPoE server with the broadcast MAC address in an initial IPCP negotiation message.

18. The method of claim 15, wherein the discovering a first network device and a second network device comprises:
   discovering the PPPoE server and the PPPoE client; and
   establishing connections between the first network device and the PPPoE client and the second network device and the PPPoE server respectively.

19. The method of claim 15, wherein the PPPoE client uses the destination MAC address of the PPPoE server when transmitting a PPP (Point-to-Point Protocol) frame.

20. The method of claim 15, wherein the PPP connection between the PPPoE client and the PPPoE server provides a transport service between the PPPoE client and the PPPoE server.

21. The method of claim 20, wherein a PPP frame is handled in a same manner as a regular data link layer frame over the connection between the PPPoE client and the PPPoE server.

* * * * *